(12) United States Patent
Kim et al.

(10) Patent No.: US 7,436,108 B2
(45) Date of Patent: Oct. 14, 2008

(54) RED PHOSPHOR FOR PLASMA DISPLAY PANEL AND PLASMA DISPLAY PANEL INCLUDING PHOSPHOR LAYER FORMED OF THE RED PHOSPHOR

(75) Inventors: Young-Kwan Kim, Suwon-si (KR); Young-Gil Yoo, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/730,134

(22) Filed: Mar. 29, 2007

(65) Prior Publication Data

US 2007/0228970 A1   Oct. 4, 2007

(30) Foreign Application Priority Data

Mar. 29, 2006   (KR) .................. 10-2006-0028398

(51) Int. Cl.
*H01J 1/62* (2006.01)
*H01J 17/49* (2006.01)

(52) U.S. Cl. ................ 313/486; 313/582; 313/485; 252/301.4 R; 252/301.4 F

(58) Field of Classification Search .......... 313/582–587
See application file for complete search history.

(56) References Cited

U.S. PATENT DOCUMENTS

| 5,541,618 A | 7/1996 | Shinoda |
| 5,661,500 A | 8/1997 | Shinoda et al. |
| 5,663,741 A | 9/1997 | Kanazawa |
| 5,674,553 A | 10/1997 | Sinoda et al. |
| 5,724,054 A | 3/1998 | Shinoda |
| 5,786,794 A | 7/1998 | Kishi et al. |
| 5,952,782 A | 9/1999 | Nanto |

(Continued)

FOREIGN PATENT DOCUMENTS

JP   02-148645   6/1990

(Continued)

OTHER PUBLICATIONS

"*Final Draft International Standard*", Project No. 47C/61988-1/Ed. 1; Plasma Display Panels—Part 1: Terminology and letter symbols, published by International Electrotechnical Commission, IEC. in 2003, and Appendix A—Description of Technology, Annex B—Relationship Between Voltage Terms And Discharge Characteristics; Annex C—Gaps and Annex D—Manufacturing.

*Primary Examiner*—Mariceli Santiago
*Assistant Examiner*—Donald L Raleigh
(74) *Attorney, Agent, or Firm*—Robert E. Bushnell, Esq.

(57) ABSTRACT

A red phosphor for a plasma display panel (PDP) including $(Y,Gd)Al_3(BO_3)_4:Eu^{3+}$, a paste composition including the same and a plasma display panel including a phosphor layer made out of the red phosphor. The red phosphor for a plasma display panel can have reduced decay time by using $(Y,Gd)Al_3(BO_3)_4:Eu^{3+}$ alone or as a main constituent in a combination with $(Y,Gd)BO_3:Eu^{3+}$. In addition, in a plasma display panel (PDP) including a phosphor layer made out of the red phosphor, by reducing the decay time of the PDP, coloring properties thereof can be improved and luminance saturation thereof at a high gradation degree occurring when $Y(V,P)O_4:Eu^{3+}$ is used to improve color coordinates can be prevented.

8 Claims, 1 Drawing Sheet

U.S. PATENT DOCUMENTS

| | | |
|---|---|---|
| 6,197,218 B1 * | 3/2001 | Hampden-Smith et al. ........ 252/301.4 R |
| RE37,444 E | 11/2001 | Kanazawa |
| 6,630,916 B1 | 10/2003 | Shinoda |
| 6,707,436 B2 | 3/2004 | Setoguchi et al. |
| 6,965,193 B2 * | 11/2005 | Srivastava et al. ............ 313/486 |
| 2004/0113538 A1 * | 6/2004 | Srivastava et al. ............ 313/486 |
| 2006/0232207 A1 * | 10/2006 | Sugimoto et al. ............ 313/582 |

FOREIGN PATENT DOCUMENTS

| | | |
|---|---|---|
| JP | 2845183 | 10/1998 |
| JP | 2917279 | 4/1999 |
| JP | 2001-043804 | 2/2001 |
| JP | 2001-325888 | 11/2001 |

* cited by examiner

RED PHOSPHOR FOR PLASMA DISPLAY PANEL AND PLASMA DISPLAY PANEL INCLUDING PHOSPHOR LAYER FORMED OF THE RED PHOSPHOR

CLAIM OF PRIORITY

This application makes reference to, incorporates the same herein, and claims all benefits accruing under 35 U.S.C.§ 119 from an application for RED PHOSPHOR FOR PLASMA DISPLAY PANEL AND PLASMA DISPLAY PANEL INCLUDING PHOSPHOR LAYER FORMED OF THE RED PHOSPHOR earlier filed in the Korean Intellectual Property Office on 29 Mar. 2006 and there duly assigned Serial No. 10-2006-0028398.

BACKGROUND OF THE INVENTION

1. Field of the Invention

The present invention relates to a red phosphor for a plasma display panel (PDP), and more particularly, to a red phosphor for a plasma display panel, a paste composition including the same and a plasma display panel including a phosphor layer made of the red phosphor.

2. Description of the Related Art

Phosphors emit light when they are exposed to energy. Phosphors are used in light sources, such as mercury fluorescent lamps or mercury free fluorescent lamps, electron emission devices, panel display panels (PDPs), etc. In the future, phosphors will be used for a wider range of applications, as new multimedia devices are developed.

Plasma display panels (PDPs) are flat panel displays that display images using light emitted by ultraviolet rays that are created by discharge of a mixture of gases including neon and xenon injected into an area between a pair of glass substrates. At this time, visible light is created by each phosphor using resonance radiation light of Xe ion (147 nm vacuum ultraviolet rays). Phosphors used in PDPs have been developed by reforming cathode ray tube (CRT) phosphors that were used in the initial development of PDPs or fluorescent materials used in new application products of phosphors such as fluorescent lamps, etc. Phosphors used in PDPs require good emission luminance, high emission efficiency, high color purity and short decay time, and in particular, are not be degraded by heat or ultraviolet rays.

$(Y,Gd)BO_3:Eu^{3+}$ is a red phosphor that is widely used in red phosphor layers in PDPs, and which has the best luminance among conventional red phosphors. However, while $(Y,Gd)BO_3:Eu^{3+}$ has higher luminance compared to other types of red phosphors, it has lower color purity and longer decay time. Therefore, a method of additionally installing a filter for correcting colors in a PDP has been used. However, when such a method is used, luminance of a PDP decreases by 30-40%, and an additional device is needed, thereby increasing the manufacturing cost of the PDP.

Meanwhile, it has been suggested that $(Y,Gd)BO_3:Eu^{3+}$ be used in combination with phosphors having excellent color purity such as $Y(V,P)O_4:Eu^{3+}$. However, $Y(V,P)O_4:Eu^{3+}$ has a relative luminance of about 65% compared with $(Y,Gd)BO_3:Eu^{3+}$. In particular, $Y(V,P)O_4:Eu^{3+}$ has lower luminance saturation, and thus the color gamut is decreased due to luminance decrease at a high gradation degree. To address those problems, various phosphors having excellent color purity have been developed. However, since such phosphors have low luminance, they are not suitable for plasma display panels. Therefore, what is needed is an improved red phosphor for a plasma display panel that overcomes the above problems.

SUMMARY OF THE INVENTION

The present invention provides a red phosphor for a plasma display panel having a short decay time and improved color purity.

The present invention also provides a paste composition for a plasma display panel including the red phosphor.

The present invention also provides a red phosphor layer for a plasma display panel, which is prepared using the paste composition including the red phosphor.

The present invention also provides a plasma display panel including a phosphor layer made out of the red phosphor.

According to one aspect of the present invention, there is provided a red phosphor for a is plasma display panel that includes $(Y,Gd)Al_3(BO_3)_4:Eu^{3+}$. The red phosphor can also include $(Y,Gd)BO_3:Eu^{3+}$. An amount of $(Y,Gd)Al_3(BO_3)_4:Eu^{3+}$ can be 10-90 weight % based on a total amount of the red phosphor. An amount of $(Y,Gd)BO_3:Eu^{3+}$ can be 40-70 weight % based on a total amount of the red phosphor.

According to another aspect of the present invention, there is provided a paste composition for a plasma display panel that includes a red phosphor that includes $(Y,Gd)Al_3(BO_3)_4:Eu^{3+}$, a binder; and a solvent. The red phosphor may also include $(Y,Gd)BO_3:Eu^{3+}$. An amount of $(Y,Gd)Al_3(BO_3)_4:Eu^{3+}$ can be 10-90 weight % based on a total amount of the red phosphor. An amount of $(Y,Gd)BO_3:Eu^{3+}$ can be 40-70 weight % based on a total amount of the red phosphor.

According to yet another aspect of the present invention, there is provided a phosphor layer for a plasma display panel, prepared by printing, drying and sintering the paste composition comprising a red phosphor that comprises $(Y,Gd)Al_3(BO_3)_4:Eu^{3+}$, a binder and a solvent. The red phosphor can also include $(Y,Gd)BO_3:Eu^{3+}$. An amount of $(Y,Gd)Al_3(BO_3)_4:Eu^{3+}$ can be 10-90 weight % based on a total amount of the red phosphor. An amount of $(Y,Gd)BO_3:Eu^{3+}$ can be 40-70 weight % based on a total amount of the red phosphor.

According to still yet another aspect of the present invention, there is provided a plasma display panel that includes a transparent front substrate, a rear substrate parallel to the transparent front substrate and separated by a distance from the transparent front substrate, a plurality of discharge cells defined by a plurality of barrier ribs arranged between the transparent front substrate and the rear substrate, a plurality of pairs of sustain electrodes arranged on the transparent front substrate and extending in a first direction to correspond to the discharge cells, a plurality of address electrodes arranged on the rear substrate and extending in a second direction perpendicular to the first direction to correspond to the discharge cells, a rear dielectric layer covering the address electrodes, red, green and blue phosphor layers arranged within the discharge cells, a front dielectric layer covering the pairs of sustain electrodes and a discharge gas arranged within the discharge cells, wherein the red phosphor layer is comprised of a red phosphor that includes $(Y,Gd)Al_3(BO_3)_4:Eu^{3+}$. The red phosphor can also include $(Y,Gd)BO_3:Eu^{3+}$. An amount of $(Y,Gd)Al_3(BO_3)_4:Eu^{3+}$ can be 10-90 weight % based on a total amount of the red phosphor. An amount of $(Y,Gd)BO_3:Eu^{3+}$ can be 40-70 weight % based on a total amount of the red phosphor.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
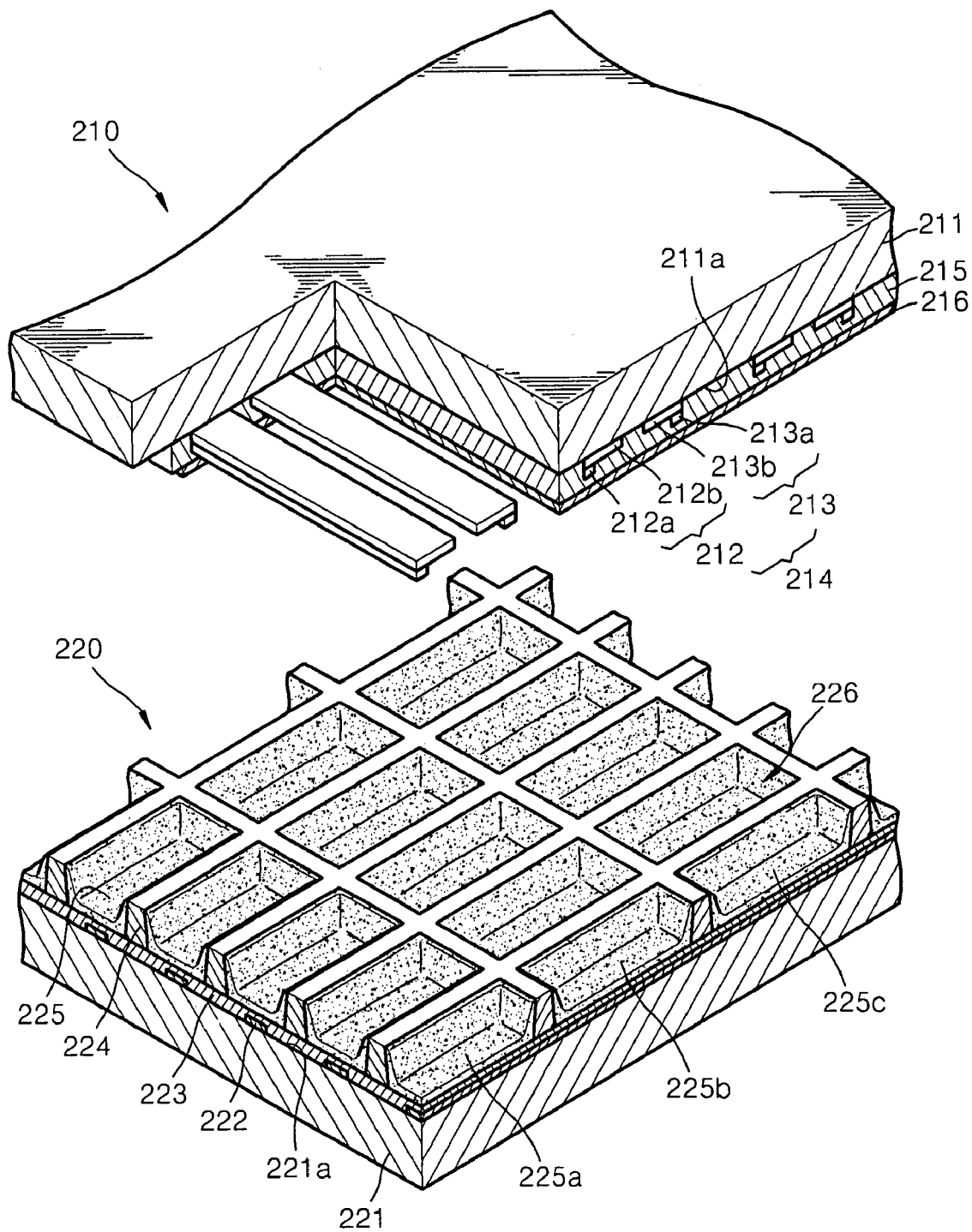
FIG. 1 is a perspective view illustrating a plasma display panel according to an embodiment of the present invention.

The present invention will now be described more fully with reference to FIG. 1. The present invention relates to a red phosphor for a plasma display panel (PDP), including (Y,Gd)Al$_3$(BO$_3$)$_4$:Eu$^{3+}$. (Y,Gd)Al$_3$(BO$_3$)$_4$:Eu$^{3+}$ can be used alone or in combination with (Y,Gd)BO$_3$:Eu$^{3+}$ as the red phosphor for a plasma display panel according to an embodiment of the present invention.

In the current embodiment of the present invention, (Y,Gd)Al$_3$(BO$_3$)$_4$:Eu$^{3+}$ has high color purity as a red phosphor. When (Y,Gd)Al$_3$(BO$_3$)$_4$:Eu$^{3+}$ is excited by ultraviolet rays in the wavelength range of 147-172 nm that are created by a plasma of Xe gas, (Y,Gd)Al$_3$(BO$_3$)$_4$:Eu$^{3+}$ has a red emission peak at 595 nm. The red phosphor according to the current embodiment of the present invention is generally prepared by mixing the compounds shown in Formula 1 together according to compositions of the compounds in Formula 1 below and sintering the resultant:

0.6Y$_2$O$_3$+0.4Gd$_2$O$_3$+2B$_2$O$_3$+1.5Al$_2$O$_3$+0.1 m/o Eu$^{+2}$    Formula (1)

In the composition represented by Formula 1, an yttrium oxide, a gadolinium oxide, a boron oxide, an alumina oxide and an europium oxide are uniformly mixed. Here, Y$_2$O$_3$ is used as an yttrium oxide, Gd$_2$O$_3$ is used as a gadolinium oxide, B$_2$O$_3$ is used as a boron oxide and Al$_2$O$_3$ is used as an alumina oxide. The mixture is heat treated in air at 1,150°C for two hours to produce (Y,Gd)Al$_3$(BO$_3$)$_4$:Eu$^{3+}$.

(Y,Gd)BO$_3$:Eu$^{3+}$ is a red phosphor that is widely used in plasma display panels and which has the best luminance among conventional red phosphors. (Y,Gd)Al$_3$(BO$_3$)$_4$:Eu$^{3+}$, according to the current embodiment of the present invention, has reduced luminance compared to (Y,Gd)BO$_3$:Eu$^{3+}$. As a result, (Y,Gd)Al$_3$(BO$_3$)$_4$:Eu$^{3+}$ is used in combination with (Y,Gd)BO$_3$:Eu$^{3+}$ to improve color purity and prevent luminance decrease.

Accordingly, when (Y,Gd)Al$_3$(BO$_3$)$_4$:Eu$^{3+}$ is used in combination with (Y,Gd)BO$_3$:Eu$^{3+}$, the amount of (Y,Gd)Al$_3$(BO$_3$)$_4$:Eu$^{3+}$ may be 10-90 weight % based on the total amount of the red phosphor. When the amount of (Y,Gd)Al$_3$(BO$_3$)$_4$:Eu$^{3+}$ is less than 10 weight % based on the total amount of the red phosphor, the red phosphor has reduced color purity. When the amount of (Y,Gd)Al$_3$(BO$_3$)$_4$:Eu$^{3+}$ is greater than 90 weight % based on the total amount of the red phosphor, the red phosphor has relatively lower luminance. According to the current embodiment of the present invention, the amount of (Y,Gd)Al$_3$(BO$_3$)$_4$:Eu$^{3+}$ is ideally 40-70 weight %.

According to an embodiment of the present invention, there is provided a paste composition for a plasma display panel, including a red phosphor including (Y,Gd)Al$_3$(BO$_3$)$_4$:Eu$^{3+}$, a binder and a solvent. To easily print the phosphor according to the current embodiment of the present invention, the phosphor can be mixed with a binder and a solvent to obtain a paste phase composition, and then the paste phase composition is screen printed using a screen mesh. Then, the printed composition is dried and sintered to form a phosphor layer. The drying temperature of the printed composition may be in the range of 100-150° C., and the sintering temperature may be in the range of 350-600° C., ideally about 450° C., to remove organic materials of the paste phase composition.

The binder can be butyl carbitol acetate and/or ethyl cellulose, etc., and the amount of the binder may be in the range of 10-30 parts by weight based on 100 parts by weight of the phosphor. When the amount of the binder is less than 10 parts by weight based on 100 parts by weight of the phosphor, the binding force of the phosphor layer may decrease. On the other hand, when the amount of the binder is greater than 30 parts by weight based on 100 parts by weight of the phosphor, the amount of phosphor in the phosphor layer is relatively low, and thus color purities of the phosphor layer may decrease.

The solvent can be butyl carbitol (BCA) or terpineol, and the amount of the solvent may be in the range of 70-300 parts by weight based on 100 parts by weight of the phosphor. When the amount of the solvent is less than 70 parts by weight based on 100 parts by weight of the phosphor, the phosphor is insufficiently dispersed or the viscosity of the paste phase composition is so high that printing is difficult. On the other hand, when the amount of the solvent is greater than 300 parts by weight based on 100 parts by weight of the phosphor, the amount of phosphor per unit area is too low and thus luminance of the PDP decreases.

The viscosity of the paste phase composition may be in the range of 5,000-50,000 cps, but ideally 20,000 cps. When the viscosity of the paste phase composition is less than 5,000 cps, the printing solution may leak out to adjacent light-emitting cells 226 during a printing process, thus making it difficult to precisely form a printed layer at a desired location. On the other hand, when the viscosity of the paste phase composition is greater than 50,000 cps, it is unsuitable for printing.

The paste phase composition according to the current embodiment of the present invention can further include additives such as a dispersant, a plasticizer, an antioxidant, a leveler or the like, if necessary. In addition, all of the above additives are known to those of ordinary skill in the art. The amount of the additives may be 0.1-10 parts by weight based on a total amount of the paste phase composition.

According to another embodiment of the present invention, a phosphor layer for a plasma display panel can be prepared by printing, drying and sintering a paste composition including a red phosphor including (Y,Gd)Al$_3$(BO$_3$)$_4$:Eu$^{3+}$, a binder and a solvent.

A PDP including a phosphor layer made out of the red phosphor according to an embodiment of the present invention will now be described in detail. A PDP according to an embodiment of the present invention includes a transparent front substrate, a rear substrate which is parallel to the transparent front substrate, light-emitting cells defined by barrier ribs formed between the transparent front substrate and the rear substrate, address electrodes extending in a first direction to correspond to light-emitting cells, a rear dielectric layer covering the address electrodes, red, green and blue phosphor layers disposed inside the light-emitting cells, pairs of sustain electrodes extending in a second direction and crossing the address electrodes, a front dielectric layer covering the pairs of sustain electrodes, and a discharge gas filled inside the light-emitting cells, wherein the red phosphor layer includes (Y,Gd)Al$_3$(BO$_3$)$_4$: Eu$^{3+}$. The PDP having this structure will now be described in more detail with reference to FIG. 1.

FIG. 1 is a perspective view illustrating a PDP according to an embodiment of the present invention. Referring to FIG. 1, the PDP includes a front panel 210 and a rear panel 220. The front panel 210 includes a front substrate 211, a plurality of pairs of sustain electrodes 214 that are disposed on a bottom surface 211a of the front substrate 211 and extend in a first direction to correspond to light-emitting cells 226, a front dielectric layer 215 covering the pairs of sustain electrodes 214, and a protective layer 216.

The rear panel 220 includes a rear substrate 221 which is parallel to the front substrate 211, address electrodes 222 disposed on a front surface 221a of the rear substrate 221 and extending in a second direction perpendicular to the first direction to cross the pairs of sustain electrodes 214, a rear dielectric layer 223 covering the address electrodes 222, barrier ribs 224 formed between the front substrate 211 and the rear substrate 221, wherein the barrier ribs 224 are disposed on the rear dielectric layer 223, and define the light-emitting cells 226, and red phosphor layers 225a, green phosphor layers 225b, and blue phosphor layers 225c, respectively made out of red phosphor, green phosphor, and blue phosphor that emit visible rays upon being excited by ultraviolet rays emitted from a discharge gas generated due to sustain discharges occurring inside the light-emitting cells 226.

The red phosphor layers 225a can be made out of a phosphor including $(Y,Gd)Al_3(BO_3)_4:Eu^{3+}$ according to the current embodiment of the present invention. The green phosphor layers 225b and the blue phosphor layers 225c can be any green and blue phosphor layers that are conventionally used in the process of manufacturing a PDP.

In general, the front substrate 211 and the rear substrate 221 are made out of glass. The front substrate 211 may have high light transmittance. The address electrodes 222, which are disposed on the front surface 221a of the rear substrate 221 and extend in the second direction to correspond to the light-emitting cells 226, may be made out of a metal having high electrical conductivity, such as Al. The address electrodes 222 are used together with a Y electrode to be later described to generate an address discharge within selected discharge cells 226 that are to emit light. In the selected light-emitting cells 226 where an address discharge has occurred, a sustain discharge can subsequently occur.

The address electrodes 222 are covered by the rear dielectric layer 223, which prevents collision of the address electrodes 222 with charged particles that are generated during the address discharge, so that the address electrodes 222 can be protected. The rear dielectric layer 223 may be made out of a dielectric material capable of inducing discharged particles. The dielectric material can be $PbO$, $B_2O_3$, $SiO_2$, or the like.

The barrier ribs 224 defining the light-emitting cells 226 are formed between the front substrate 211 and the rear substrate 221. The barrier ribs 224 secure a discharge space between the front substrate 211 and the rear substrate 221, prevent crosstalk between adjacent light-emitting cells 226, and enlarge the surface area upon which the phosphor layer 225 can reside. The barrier ribs 224 may be made out of a glass material including Pb, B, Si, Al, or O, and when required, the barrier ribs 224 may further include a filler, such as $ZrO_2$, $TiO_2$, and $Al_2O_3$, and a pigment, such as Cr, Cu, Co, Fe, or $TiO_2$.

The pairs of sustain electrodes 214 extend in the first direction to correspond to the light-emitting cells 226, perpendicular to the second direction in which the address electrodes 222 extend. Each of the pairs of sustain electrodes 214 includes an X electrode 213 and a Y electrode 212 that produces a sustain discharge. The pairs of sustain electrodes 214 are disposed parallel to each other at predetermined intervals on the bottom surface 211a of the front substrate 211. The sustain discharge occurs due to a potential difference between the X electrodes 213 and the Y electrodes 212.

The X electrodes 213 and the Y electrodes 212 include transparent electrodes 213b and 212b and bus electrodes 213a and 212a, respectively. In some cases, however, the bus electrodes 213a and 212a can be solely used to form a X and Y electrodes.

The transparent electrodes 213b and 212b may be made out of a conductive and transparent material, so that the light emitted from a phosphor can be transmitted through the front substrate 211 without being blocked. The conductive and transparent material used to form the transparent electrodes 213b and 212b can be indium tin oxide (ITO). However, since the conductive and transparent material, such as ITO has a high resistance, and when the sustain electrodes 214 are only made out of the transparent electrodes 213b and 212b, the sustain electrodes 214 have a large voltage drop in a lengthwise direction of the transparent electrodes 213b and 212b, and thus the power consumption of the PDP increases and the response speed of images reduces. In order to prevent these problems, the bus electrodes 213a and 212a made out of a highly conductive metal such as Ag, and are included at external ends of the transparent electrodes 213b and 212b.

X and Y electrodes 213 and 212 are covered by the front dielectric layer 215. The front dielectric layer 215 electrically insulates the X electrodes from the Y electrodes 212, and prevents collisions of charged particles with the X and Y electrodes 213 and 212, so that the sustain electrodes 214 can be protected. The front dielectric layer 215 is made out of a dielectric material having high light transmittance, such as $PbO$, $B_2O_3$, $SiO_2$, or the like.

The protective layer 216 can be formed on the front dielectric layer 215. The protective layer 216 prevents collisions of charged particles with the front dielectric layer 215 so the front dielectric layer 215 can be protected, and generates many secondary electrons during the sustain discharge. The protective layer 216 may be made out of MgO.

The light-emitting cells 226 are filled with a discharge gas. The discharge gas can be, for example, a gaseous mixture of Ne and Xe, in which the amount of Xe is in the range of 5%-10%. When needed, He can be substituted for a portion of the Ne.

The present invention will be described in further detail with reference to the following Examples and a Comparative Example. These examples are for illustrative purposes only and are not intended to limit the scope of the present invention.

EXAMPLES

Example 1

100 weight % of $(Y,Gd)Al_3(BO_3)_4:Eu^{3+}$ was mixed with a vehicle prepared by mixing butyl carbitol acetate and ethyl cellulose to prepare a paste composition. The prepared paste composition was printed on barrier ribs of a plasma display panel to prepare a red phosphor layer.

Example 2

A red phosphor layer was prepared in the same manner as in Example 1, except that 30 weight % of $(Y,Gd)Al_3(BO_3)_4:Eu^{3+}$ and 70 weight % of $(Y,Gd)BO_3:Eu^{3+}$ were used.

Example 3

A red phosphor layer was prepared in the same manner as in Example 1, except that 40 weight % of $(Y,Gd)Al_3(BO_3)_4:Eu^{3+}$ and 60 weight % of $(Y,Gd)BO_3:Eu^{3+}$ were used.

Example 4

A red phosphor layer was prepared in the same manner as in Example 1, except that 50 weight % of $(Y,Gd)Al_3(BO_3)_4$:$Eu^{3+}$ and 50 weight % of $(Y,Gd)BO_3$:$Eu^{3+}$ were used.

Example 5

A red phosphor layer was prepared in the same manner as in Example 1, except that 60 weight % of $(Y,Gd)Al_3(BO_3)_4$:$Eu^{3+}$ and 40 weight % of $(Y,Gd)BO_3$:$Eu^{3+}$ were used.

Example 6

A red phosphor layer was prepared in the same manner as in Example 1, except that 70 weight % of $(Y,Gd)Al_3(BO_3)_4$:$Eu^{3+}$ and 30 weight % of $(Y,Gd)BO_3$:$Eu^{3+}$ were used.

Example 7

A red phosphor layer was prepared in the same manner as in Example 1, except that 80 weight % of $(Y,Gd)Al_3(BO_3)_4$:$Eu^{3+}$ and 20 weight % of $(Y,Gd)BO_3$:$Eu^{3+}$ were used.

Comparative Example

A red phosphor layer was prepared in the same manner as in Example 1, except that 100 weight % of $(Y,Gd)BO_3$:$Eu^{3+}$ was used alone without using any $(Y,Gd)Al_3(BO_3)_4$:$Eu^{3+}$.

Properties of Example 1 through 7 and the Comparative Example are shown in Table 1:

invention, by reducing the afterglow time of the PDP, coloring properties thereof can be improved and luminance saturation thereof can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A red phosphor for a plasma display panel, comprising: $(Y,Gd)Al_3(BO_3)_4$:$Eu^{3+}$; and $(Y,Gd)BO_3$:$Eu^{3+}$, wherein an amount of $(Y,Gd)Al_3(BO_3)_4$:$Eu^{3+}$ is 10-90 weight % based on a total amount of the red phosphor.

2. The red phosphor of claim 1, wherein an amount of $(Y,Gd)BO_3$:$Eu^{3+}$ is 40-70 weight % based on a total amount of the red phosphor.

3. A paste composition for a plasma display panel, comprising:
   a binder;
   a solvent; and
   a red phosphor that comprises $(Y,Gd)Al_3(BO_3)_4$:$Eu^{3+}$ and $(Y,Gd)BO_3$:$Eu^{3+}$, wherein an amount of $(Y,Gd)Al_3(BO_3)_4$:$Eu^{3+}$ is 10-90 weight % based on a total amount of the red phosphor 4. The paste composition of claim 3, wherein an amount of $(Y,Gd)BO_3$:$Eu_{3+}$ is 40-70 weight % based on a total amount of the red phosphor.

|  | $(Y,Gd)Al_3(BO_3)_4$:$Eu^{3+}$ | $(Y,Gd)BO_3$:$Eu^{3+}$ | Relative luminance (%) | x | y | Afterglow time (ms) |
| --- | --- | --- | --- | --- | --- | --- |
| Example 1 | 100 | 0 | 50 | 0.662 | 0.328 | 3 |
| Example 2 | 30 | 70 | 85 | 0.6487 | 0.3406 | 9.3 |
| Example 3 | 40 | 60 | 80 | 0.6506 | 0.3388 | 8.4 |
| Example 4 | 50 | 50 | 75 | 0.6525 | 0.337 | 7.5 |
| Example 5 | 60 | 40 | 70 | 0.6544 | 0.3352 | 6.6 |
| Example 6 | 70 | 30 | 65 | 0.6563 | 0.3334 | 5.7 |
| Example 7 | 80 | 20 | 60 | 0.6582 | 0.3316 | 4.8 |
| Comparative Example | 0 | 100 | 100 | 0.643 | 0.346 | 12 |

Referring to Table 1, it can be seen that the red phosphor layers of Examples 1 through 7 have relatively shorter afterglow time compared with the red phosphor layer of Comparative Example 1 prepared using 100 weight% of $(Y,Gd)BO_3$:$Eu^{3+}$ alone. From the results, it can be confirmed that a plasma display panel including a phosphor layer made out of the red phosphor according to the present invention prepared using $(Y,Gd)Al_3(BO_3)4$:$Eu^{3+}$ alone or as a main constituent in a combination with $(Y,Gd)BO_3$:$Eu^{3+}$ can have similar luminance and color coordinates (x,y) to those of a plasma display panel including a phosphor layer made out of a phosphor that includes only $(Y,Gd)BO_3$:$Eu^{3+}$. In addition, luminance saturation at a high gradation degree occurring when $Y(V,P)O_4$:$Eu^{3+}$ is used to improve color coordinates can be prevented.

The red phosphor for a plasma display panel according to the present invention can have reduced afterglow time by being made with $(Y,Gd)Al_3(BO_3)_4$:$Eu^{3+}$ alone or as a main constituent in a combination with $(Y,Gd)BO_3$:$Eu^{3+}$. In addition, in a plasme display pannel (PDP) including a Phosphor layer made of the red phosphor according to the present 5. A phosphor layer for a plasma display panel, prepared by printing, drying and sintering a paste composition comprising:
   a binder;
   a solvent; and
   a red phosphor that comprises $(Y,Gd)Al_3(BO_3)_4$:$Eu^{3+}$, and $(Y,Gd)BO_3$:$Eu^{3+}$, wherein an amount of $(Y,Gd)Al_3(BO_3)_4$:$Eu^{3+}$ is 10-90 weight % based on a total amount of the red phosphor.

6. The phosphor layer of claim 5, wherein an amount of $(Y,Gd)BO_3$:$Eu^{3+}$ is 40-70 weight % based on a total amount of the red phosphor.

7. A plasma display panel (PDP) comprising:
   a transparent front substrate;
   a rear substrate parallel to the transparent front substrate and separated by a distance from the transparent front substrate;
   a plurality of discharge cells defined by a plurality of barrier ribs arranged between the transparent front substrate and the rear substrate;

a plurality of pairs of sustain electrodes arranged on the transparent front substrate and extending in a first direction to correspond to the discharge cells;

a plurality of address electrodes arranged on the rear substrate and extending in a second direction perpendicular to the first direction to correspond to the discharge cells;

a rear dielectric layer covering the address electrodes;

red, green and blue phosphor layers arranged within the discharge cells;

a front dielectric layer covering the pairs of sustain electrodes; and a discharge gas arranged within the discharge cells, wherein the red phosphor layer is comprised of a red phosphor that comprises $(Y,Gd)Al_3(BO_3)_4:Eu^{3+}$ and $(Y,Gd)BO_3:Eu^{3+}$, wherein an amount of $(Y,Gd)Al_3(BO_3)_4:Eu^{3+}$ is 10-90 weight % based on a total amount of the red phosphor.

8. The plasma display panel of claim 7, wherein an amount of $(Y,Gd)BO_3:Eu^{3+}$ is 40-70 weight % based on a total amount of the red phosphor.

* * * * *